(12) United States Patent
Chhaya et al.

(10) Patent No.: US 10,922,492 B2
(45) Date of Patent: Feb. 16, 2021

(54) CONTENT OPTIMIZATION FOR AUDIENCES

(71) Applicant: Adobe Inc., San Jose, CA (US)

(72) Inventors: Niyati Himanshu Chhaya, Hyderabad (IN); Tanya Goyal, Austin, TX (US); Projjal Chanda, Assam (IN); Kushal Chawla, Bengaluru (IN); Jaya Singh, Jaipur (IN); Cedric Huesler, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 262 days.

(21) Appl. No.: 16/024,131

(22) Filed: Jun. 29, 2018

(65) Prior Publication Data

US 2020/0004820 A1    Jan. 2, 2020

(51) Int. Cl.
  *G06F 40/30*    (2020.01)

(52) U.S. Cl.
  CPC .................. *G06F 40/30* (2020.01)

(58) Field of Classification Search
  CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
  USPC .......................................................... 704/9
  See application file for complete search history.

(56) References Cited

U.S. PATENT DOCUMENTS

| | | | |
|---|---|---|---|
| 9,020,956 B1 * | 4/2015 | Barr | G06F 16/951 |
| | | | 707/748 |
| 9,042,201 B2 * | 5/2015 | Tyler | A61N 7/00 |
| | | | 367/139 |
| 9,729,252 B2 * | 8/2017 | Tyler | A61B 5/0476 |
| 10,579,717 B2 * | 3/2020 | Leydon | G06Q 30/0209 |
| 10,856,032 B2 * | 12/2020 | Aimone | A61B 5/0476 |
| 2006/0080161 A1 * | 4/2006 | Arnett | G06F 21/31 |
| | | | 705/7.31 |

(Continued)

OTHER PUBLICATIONS

Gunsch, Ma et al., "Differential Forms Linguistic Content of Various Political Advertising", Journal of Broadcasting and Electronic Media, 2000, vol. 44, pp. 27-42.

(Continued)

*Primary Examiner* — Lamont M Spooner
(74) *Attorney, Agent, or Firm* — Finch & Maloney PLLC

(57) ABSTRACT

Techniques are disclosed to assist an author in creating content variations of a given input text to better suit the mood or the affect preferences of the target audience. Affect distribution in the content is utilized to capture these psycholinguistic preferences. According to one embodiment, in a first phase the optimal/idea psycholinguistic preference for text content aimed at a particular audience segment is determined. In a second phase, a given text content is modified to align to a target language distribution, which was determined in the first phase. In one example case, word level replacement, insertions and deletions are executed to generate a modified and coherent version of the input text. The output text thus reflects the psycholinguistic requirements of the audience.

20 Claims, 10 Drawing Sheets

(56) References Cited

U.S. PATENT DOCUMENTS

| | | | | |
|---|---|---|---|---|
| 2010/0257117 | A1* | 10/2010 | Shvadron | G06F 16/313 705/36 R |
| 2011/0106829 | A1* | 5/2011 | Pradhan | G06F 16/335 707/765 |
| 2012/0150972 | A1* | 6/2012 | Morris | G06Q 50/00 709/206 |
| 2014/0012863 | A1* | 1/2014 | Sundaresan | G06Q 10/00 707/750 |
| 2014/0211593 | A1* | 7/2014 | Tyler | A61B 5/0476 367/137 |
| 2014/0337257 | A1* | 11/2014 | Chatterjee | G06N 20/00 706/12 |
| 2015/0149153 | A1* | 5/2015 | Werth | G06F 40/30 704/9 |
| 2015/0343242 | A1* | 12/2015 | Tyler | A61N 7/00 367/137 |
| 2016/0034571 | A1* | 2/2016 | Setayesh | G06F 16/353 707/738 |
| 2016/0269344 | A1* | 9/2016 | Anders | H04L 51/32 |
| 2018/0322122 | A1* | 11/2018 | Miao | G06N 5/046 |
| 2019/0121842 | A1* | 4/2019 | Catalano | G06F 40/253 |
| 2019/0138923 | A1* | 5/2019 | Jacobs | G06N 20/00 |
| 2019/0155918 | A1* | 5/2019 | Jaroch | G06N 3/084 |
| 2019/0220505 | A1* | 7/2019 | Shinohara | G06F 40/186 |
| 2019/0258661 | A1* | 8/2019 | Dunne | G06F 16/285 |
| 2019/0297035 | A1* | 9/2019 | Fox | G06F 16/24575 |

OTHER PUBLICATIONS

Lowrey, T.M., "The Effects of Syntactic Complexity on Advertising Persuasiveness", Journal of Consumer Psychology, 1998, pp. 187-206.

Hovy, E., "Generating Natural Language Under Pragmatic Constraints", Journal of Pragmatics, 1987, vol. 11, pp. 689-719.

Blondel, V.D. et al., "Fast Unfolding of Communities in Large Networks", Journal of Statistical Mechanics: Theory and Experiment, 2008, 12 pages.

Blei, D.M. et al., "Latent Dirichlet Allocation", Journal of Machine Learning Research, 2003, pp. 993-1022.

Roy, R.S. et al., "Automated Linguistic Personalization of Targeted Marketing Messages Mining User-generated Text on Social Media", Springer International Publishing Switzerland, 2015, pp. 203-224.

Preotiuc-Pietro D. et al., "Personality Driven Differences in Paraphrase Preference", Proceedings of the Workshop on Natural Language Processing and Computational Social Science (NLP+CSS), ACL, 2017.

Pavlick, E. and J. Tetreault, "An Empirical Analysis of Formality in Online Communication", Transactions of the Association for Computational Linguistics, 2016, vol. 4, pp. 61-74.

"Mental State Examination", Clinical Practice Guidelines : Mental State Examination, retrieved from the Internet :URL: https://www.rch.org.au/ clinicalguide/guideline_index/Mental_state_examination/, downloaded Jun. 10, 2018, 4 pages.

Corona et al., "A Mood-based Genre Classification of Television Content", arXiv:1508.01571v1, retrieved from https://arxiv.org/pdf/1508.01571.pdf (submitted Aug. 6, 2015).

* cited by examiner

CONTENT OPTIMIZATION FOR AUDIENCES

FIELD OF THE DISCLOSURE

This disclosure relates to techniques for performing natural language processing of text. In particular, this disclosure relates to techniques for generation of content for a specific target mood or an emotional affect state.

BACKGROUND

Content creators create variations of the same content based upon the suitability of the language and preferences (psychology, age, income & mood) of the intended target audience. For example, the textual content of an email sent to a person's manager will typically be quite different from the textual content of an email sent to that person's friend. In the former case, the email may be considerably more formal. Thus, people typically customize the tone of content for the intended recipient of the content. This is true not only for interpersonal communications but also for content targeting a wider audience. For instance, an advertisement targeting teenagers will differ in its tone as compared with a campaign targeting working professionals. While a copywriter may adopt a polite tone while targeting working professionals, teenagers may not always be as concerned with such formalities. Thus, the same base content must be rewritten to achieve a desired level of formality or appropriateness for each individual target audience segment.

Studies have shown that stylistic variations have a larger impact on the audience response to content as compared with the literal meaning of the text. Along with audience related aspects, the topic of the text also plays a role in influencing the response of an audience to content and consequently towards determining the optimal tone of the content.

Thus, a need exists for techniques for modifying content to address the affect and stylistic attributes of communities and topics in order to maximize the effect of the content on achieving a desired purpose.

DETAILED DESCRIPTION

Figure 1A:
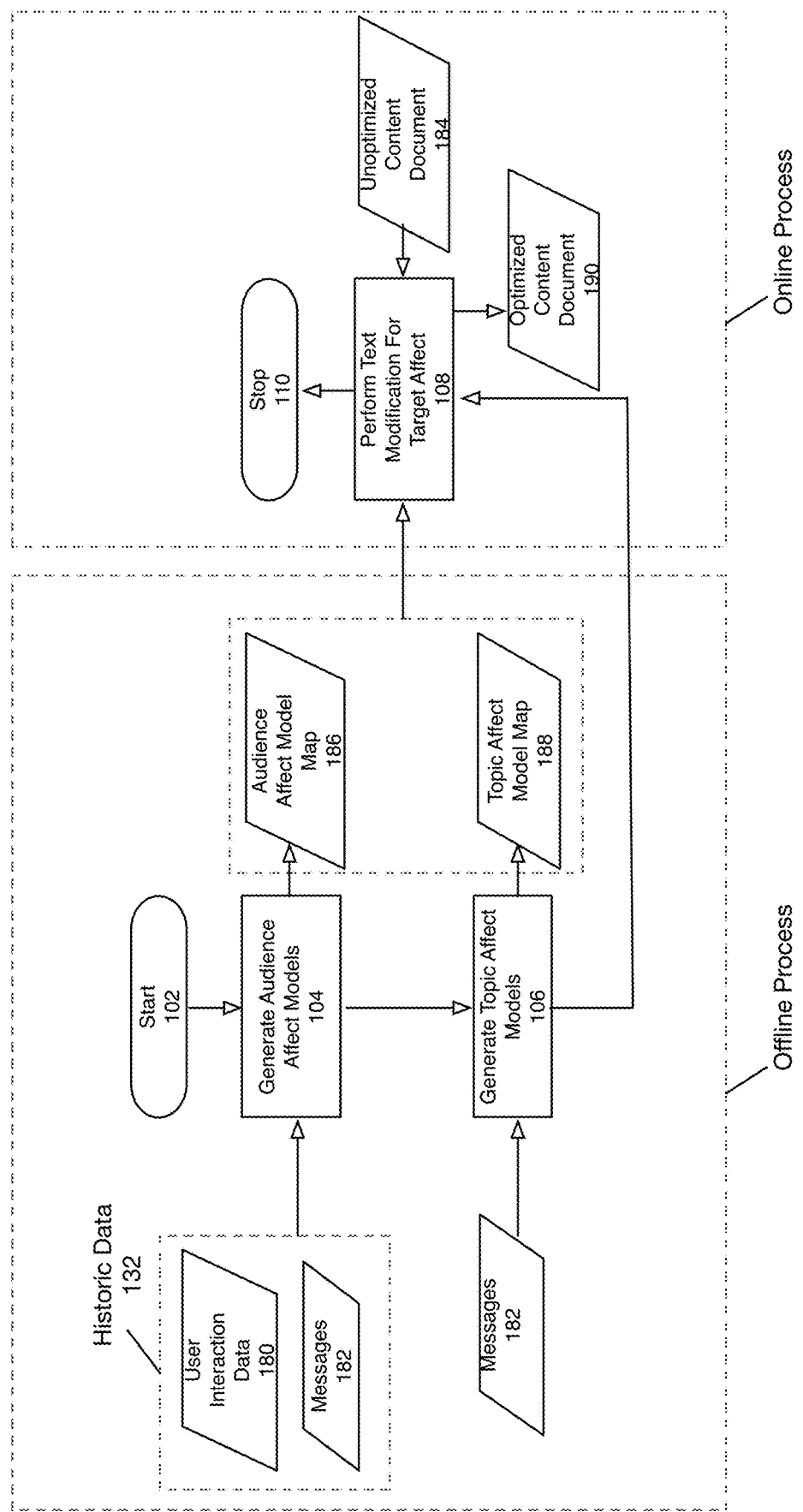
FIG. 1a is a flowchart depicting an operation of a content optimization system according to one embodiment of the present disclosure.

Techniques are disclosed for modeling target emotional affects and moods of users and for the generation of content variants tuned to specific target moods or emotional affective states. Recall that mood and emotional affect are related. To this end, and as previously noted by at least one commentator, it may be helpful to analogize the relationship between mood and emotional affect to that between season (mood) and the weather (affect). So, emotional affect refers to immediate expressions of emotion, while mood refers to emotional experience over a relatively longer period of time. Affect refers broadly to the experience and may not be immediate. For example, an emotional affect such as formality, politeness, or frustration may be expressed during a prolonged mood of happiness. Given their relatedness, the terms mood and affect are used interchangeably herein, and reference to affect is intended to include mood, and vice-versa. According to one embodiment of the present disclosure, a content variation generation system is disclosed that creates content to suit the mood and/or affect preferences of a target audience, more generally referred to herein as psycholinguistic preferences. In some such cases, affect distribution in historic content/data is analyzed to capture these psycholinguistic preferences. For purposes of the present disclosure, the term historic content/data refers to any content, data or communications such as text previously exchanged between people in the past. According to one embodiment of the present disclosure, historic content may comprise email or other messages exchanged between people. As will become evident in this disclosure, historic content in the form of messages exchanged between people is used for analytic purposes in order to perform content modification with respect to particular desired affects. For purposes of the present disclosure, the term "psycholinguistics" refers to the psychological and neurobiological factors that enable humans to acquire, use, comprehend and produce language. Thereby, the term "psycholinguistic preferences" refers to associated preferences of language content preferred by a user. In particular, linguistic content may be expressed in a myriad of forms with particular psychological import. A particular person or group may prefer specific textual content to express an idea depending upon their own preferences, demographics, age, etc.

In some such embodiments, a content variation process executed by the system comprises a target preference computation phase and a text modification phase. In the preference computation phase, audience preferences are modeled based upon, for instance, associated discussion topics and interaction patterns. In the text modification phase, the content of an input text is automatically tuned to audience preferences in a scalable manner in light of a target audience preference. For purposes of the present disclosure, the term "topic" refers to the subject of a communication between parties. Examples of topics might include business, politics, sports, cooking, etc.

In particular, according to one embodiment of the present disclosure, techniques are disclosed to assist an author in creating content variations of a given input text to better suit the mood or the affect preferences of the target audience. Affect distribution in historic content may be utilized to capture these psycholinguistic preferences. According to one embodiment, in a first phase an optimal/ideal psycholinguistic preference for text content aimed at a particular audience segment is determined. This may be achieved, for example, by analyzing historic content aimed at a particular audience segment and identifying optimal language distributions. In a second phase, a given text content is modified to align to a target language distribution, which was determined in the first phase. In particular, and further according to one embodiment, techniques are disclosed for selecting word level replacement, insertions, and deletions to generate a modified and coherent version of the input text. The output text may then reflect the psycholinguistic requirements of the audience.

According to one embodiment of the present disclosure, an ideal affect distribution for a given target audience is determined. In particular, linguistic features of historic content or communications between users in various communities (audiences) may be leveraged to determine the ideal affect distribution. Further, according to one such embodiment, an affect distribution across topics based upon historical content/communications is determined, which may be utilized to determine an optimal level of formality, politeness and frustration (emotional affect) in text corresponding to a certain topic when creating content about that topic. Note that formality, politeness and frustration are only example affects. Other embodiments may utilize any number of arbitrary affects in any combination.

Techniques are further disclosed for generating suggestions of changes to a given input text that increase or tune particular affect dimensions or parameters. According to one such embodiment, these affect dimensions may be formality, politeness or frustration. To this end, the techniques may be leveraged by content creators to vary the tone of a message across any of the three affect dimensions (formality, politeness and frustration). According to one such embodiment, the automatic generation of multiple variants of the same base content may be utilized to cater to different audience segments.

During the target preference computation phase, optimal/ideal psycholinguistic preferences are determined for text content aimed at a particular audience segment. To determine these optimal psycholinguistic preferences, according to one embodiment of the present disclosure, historic content created for particular target audience segments is analyzed to identify optimal language distributions. These distributions may be utilized in a subsequent phase to align and modify text. According to an alternative embodiment, an author may provide manual input for the emotional affect levels and the algorithm provided herein modifies the input to align with the manually provided scores. As will be appreciated in light of this disclosure, historic affect distributions are analyzed across multiple topics. As previously mentioned, historic affect distributions refer to probability distributions generated from historic content. This allows for the determination of an optimal level of formality, politeness and frustration in text tailored to individual topics.

During the text modification phase, provided text content is modified to align to a target language distribution, which was computed in the target preference phase. According to one such embodiment, word level replacements, insertions and deletions are performed to generate a modified and coherent version of the input text (the output text). The output text reflects the psycholinguistic requirements of the audience. According to one particular embodiment, a perturbation technique allows for changes to given input text that increases and/or decreases formality, politeness or frustration. This allows tuning of the tone of a message along any affect dimension. Further note that multiple variants of the same base content can be automatically generated in order to cater to different audience segments.

FIG. 1a is a flowchart depicting an operation of a content optimization system according to one embodiment of the present disclosure. The content optimization process shown in FIG. 1a may further comprise an offline process for performing generation of audience affect models and topic affect models and an online process for performing text modification based upon the audience affect models and topic affect models.

The process is initiated in 102. In 104, audience affect models are generated. In particular, as shown in FIG. 1a, in 104, according to one embodiment of the present disclosure, historic data 132, further comprising user interaction data 180 and messages 182 are received and processed to generate audience affect model map 186. User interaction data 180 represents historic data characterizing interaction between users in exchanging documents such as text messages, e-mails, etc. Messages 182 may be the actual text of exchanged messages. Audience affect model map 186 may be a mapping or assignment between a pair of communities (C, C') and affect distributions. In particular, audience affect model map 186 may associate an affect distribution with each pair of communities (C, C').

As will be described below, according to one embodiment of the present disclosure, an affect distribution may comprise a probability distribution representing the joint probability of affect scores for any number of dimensions for messages exchanged between two communities (C, C'). For example, according to one embodiment of the present disclosure, 3 affect dimensions are measured (formality (f), politeness (p) and frustration (fr)). Consider a message m belonging to MM' as the message exchanged between users of communities C and C'. Let $f_i$, $p_i$ and $fr_i$ respectively correspond to the formality, politeness and frustration affect values for a given message $m_i$. The affect distribution between C and C' is then given by $P(f_i, p_i, fr_i)$ for all $m_i$ belonging to MM'. This distribution reflects the histogram of the chances of a certain affect value ($f_i$, $p_i$, $fr_i$) existing in a message exchange between C and C'.

In the case of audience affect model map 186, the messages for which the affect distribution is determined comprises messages exchanged between pairs of communities (C, C'). That is, the joint probability distribution for all messages exchanged between two communities (C, C') with respect to a set of affects (e.g., f, p and fr) may be computed. A process for determining audience affect model map 186 is described with respect to FIGS. 1b and 1c.

In 106, messages 182 are processed to generate topic affect model map 188. Topic affect model map 188 represents a mapping between a topic in messages 182 and an affect distribution associated with that topic. Similar to audience affect model map 186, topic affect model map 188 may comprise an association between a particular topic and an affect distribution for messages associated with those topics. A process for determining topic affect model map 188 is described below with respect to FIGS. 1d and 1e.

According to one embodiment of the present disclosure, process steps 104 and 106 may be performed in an offline mode to perform audience and topic modeling in preparation for processing/modifying an actual document (online mode). In particular, it may be desired to perform processing of a document containing various content in order to optimize it for a particular audience for which it is intended and with respect to particular topics discussed in the document. Thus, in 108, unoptimized content document 184 is processed utilizing audience affect model map 186 and topic affect model map 188 to generate optimized content document 190. The process ends in 110.

Audience Affect Model Map Generation

Figure 1B:
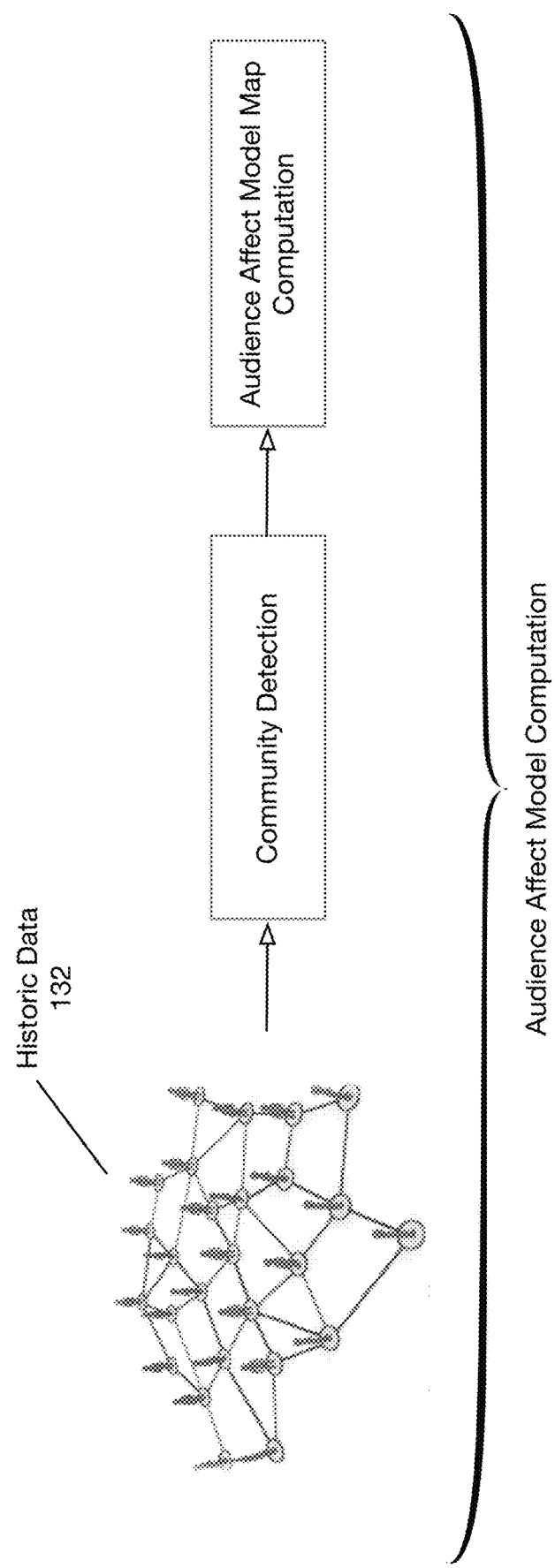
FIG. 1b is a high-level block diagram depicting a process for generating an audience affect model map according to one embodiment of the present disclosure.

FIG. 1b is a high-level block diagram depicting a process for generating an audience affect model map according to one embodiment of the present disclosure. As shown in FIG. 1b, based upon historic data 132, community detection is performed to determine communities of users. Based upon the identification of communities, audience affect model map computation is performed to map between pairs of communities (C, C') and an affect distribution.

Figure 1C:
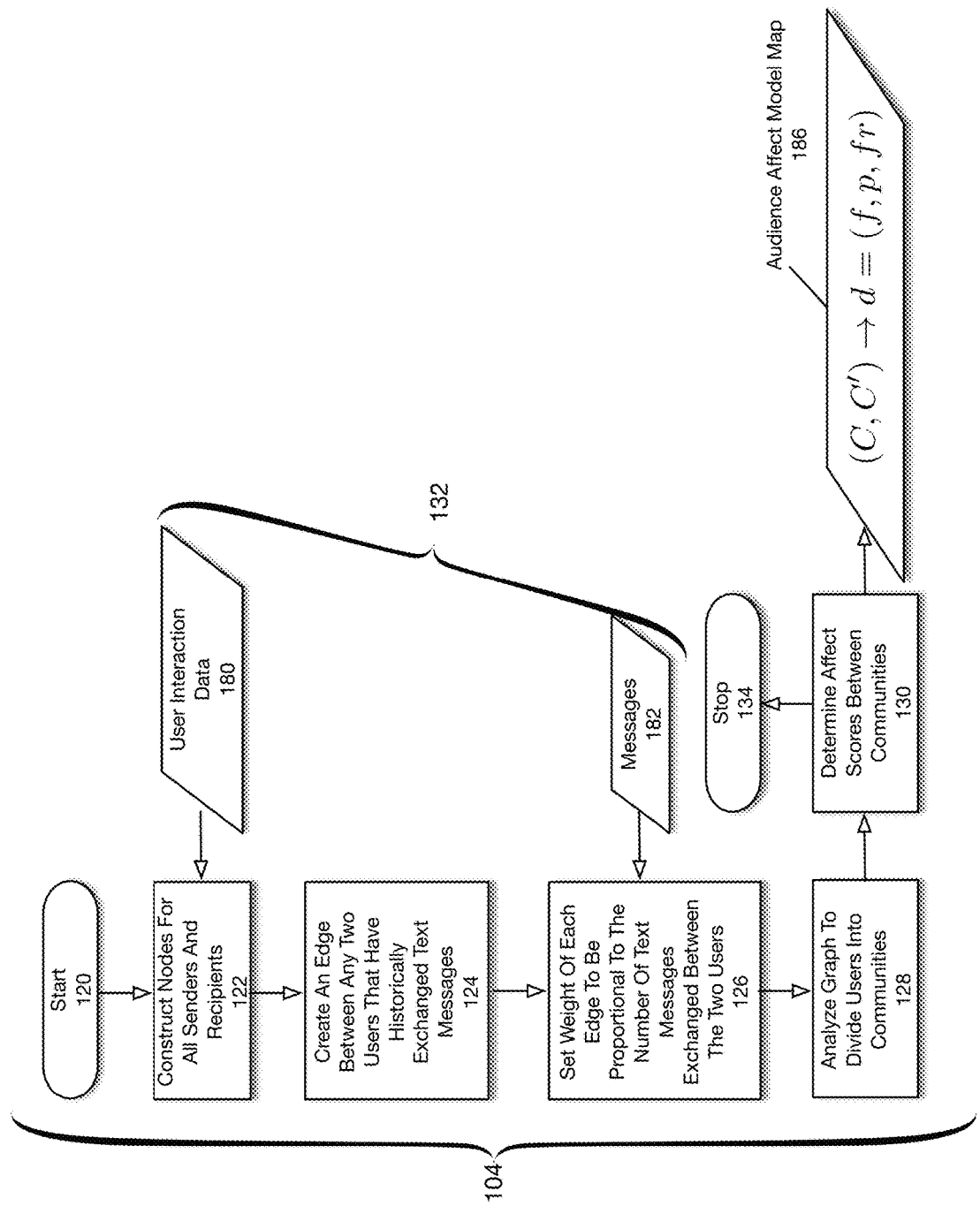
FIG. 1c is a flowchart depicting a process for generating an audience affect model map according to one embodiment of the present disclosure.

FIG. 1c is a flowchart depicting a process for generating an audience affect model map according to one embodiment of the present disclosure. The process shown in FIG. 1c corresponds to 104 in FIG. 1a. The process is initiated in 120. In 122, nodes are created for each sender and recipient of a message based upon user interaction data 180. In particular, according to one embodiment of the present disclosure, nodes are created for each user, for example from a user list, which may be included in user interaction data 180. In 124, an edge is created between any two nodes associated with users that have historically exchanged text messages. In 126, using messages 182, an edge weight is associated with each edge (generated in 124) based upon a number of messages exchanged between the users associated with each node defining the edge.

In 128, the graph created in 122-126 is analyzed to divide the users into communities. According to one embodiment of the present disclosure, the Louvain method is utilized to perform community detection. It will be recognized that the Louvain method segments nodes such that the density of edges within a community is greater than the inter-community edge densities. This ensures that users that interact more with one another are placed in the same community, while those that interact sparingly are placed in different communities.

In 130, affect scores are analyzed between the communities identified in 128 to determine audience affect model map 186:

$$(C,C') \rightarrow d=(f,p,fr)$$

In particular, according to one embodiment of the present disclosure, affect scores are computed for each pair of communities (C,C') based upon messages exchanged between the two communities across the three dimensions (f, p, fr) (formality, politeness and frustration). According to other embodiments of the present disclosure, other affect dimensions may be utilized. Note that C and C' may correspond to the same community in which case the affect scores are intra-community scores. The process ends in 134.

As will be discussed below, during an online text modification process, audience affect model map 186 may be utilized to identify the appropriate affect distribution for a particular message between two communities. In particular, according to one embodiment of the present disclosure, the mean or median of the affect scores may be chosen as the target scores for each of the affect dimensions (e.g., f, p, fr) in performing text modification.

Topic Affect Model Map Generation

Figure 1D:
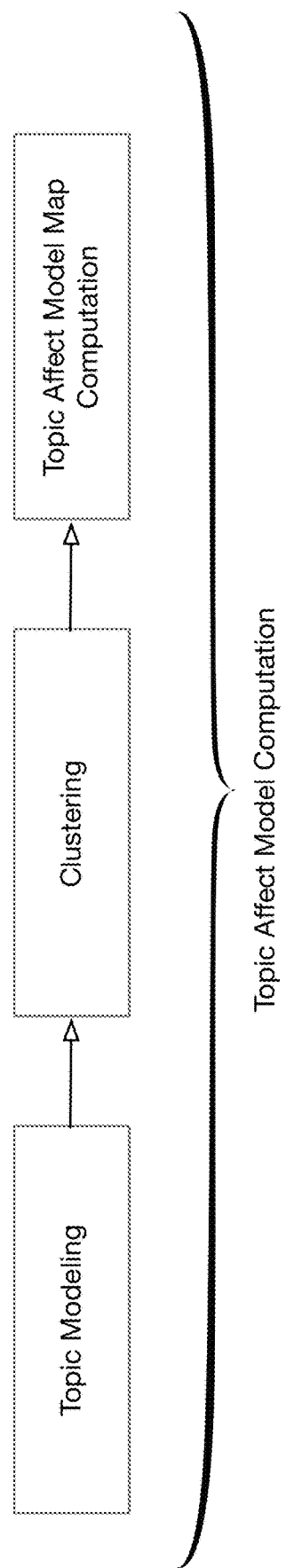
FIG. 1d is a high-level block diagram depicting a process for generating a topic affect model map according to one embodiment of the present disclosure.

FIG. 1d is a high-level block diagram depicting a process for generating a topic affect model map according to one embodiment of the present disclosure. As shown in FIG. 1d, first topic modelling is performed. According to one embodiment of the present disclosure, this may be performed using the latent Dirichlet allocation ("LDA") topic modelling algorithm. Next, a clustering process may be performed on the LDA topic modelling output using, for example, K-Means clustering. Finally, an affect score for each affect dimension may be determined for the text in each cluster, which generates a topic affect model map 188.

Figure 1E:
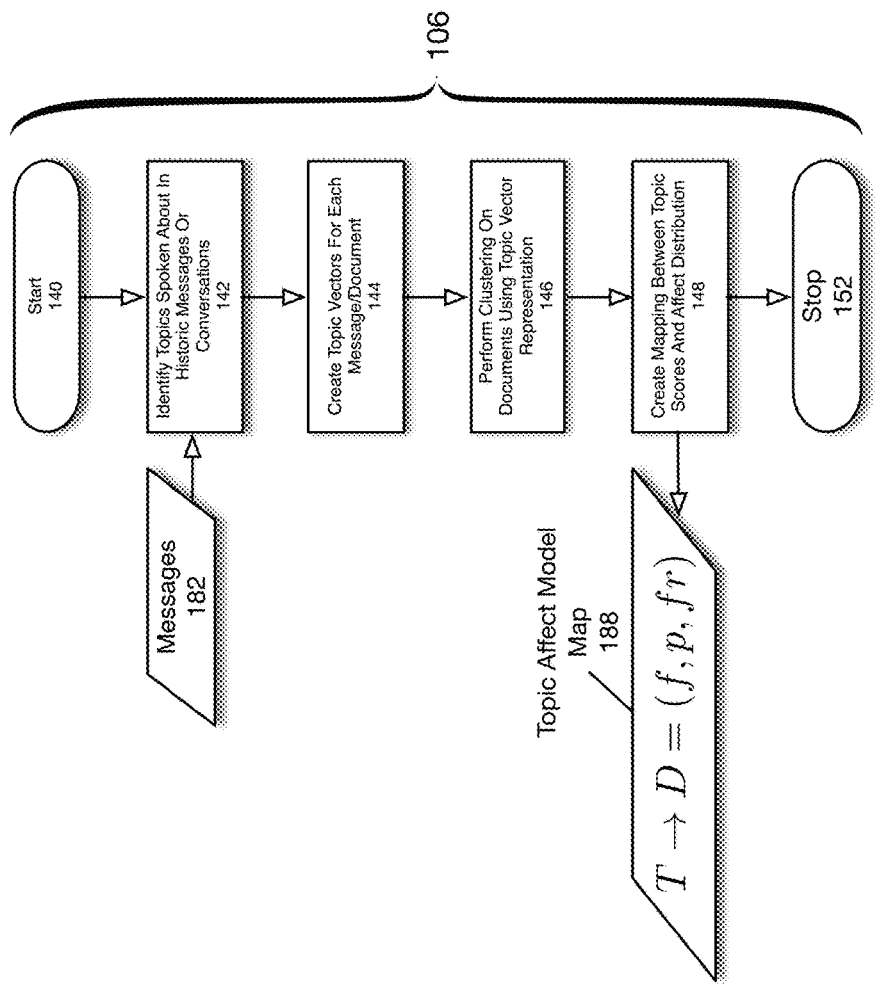
FIG. 1e is a flowchart depicting a processing for generating a topic affect model map according to one embodiment of the present disclosure.

FIG. 1e is a flowchart depicting a processing for generating a topic affect model map according to one embodiment of the present disclosure. The process shown in FIG. 1e corresponds to 106 in FIG. 1a. The process is initiated in 140. In 142, messages 182 are analyzed to identify topics discussed. Messages 182 may be messages exchanged in the past (historic) between people. As previously mentioned, according to one embodiment of the present disclosure LDA topic modelling may be utilized. In 144, topic vectors are generated for each message or document. In particular, according to one embodiment of the present disclosure, for a given message/document, the ith component in the vector corresponds to the score for the ith topic in the document. In 146, a clustering operation is performed on the topic vectors determined in 144. According to one embodiment of the present disclosure a K-Means clustering operation is performed. In particular, according to one embodiment of the present disclosure, a Euclidean distance or cosine similarity metric may be utilized to perform the clustering operation. In 148, for all documents in a cluster, a distribution among all affect dimensions (i.e., f, p and fr) is generated and the generated distribution is mapped to the topic cluster, wherein such map comprises a topic affect model map 188. The process ends in 152.

As will be discussed below, during an online text modification process, topic affect model map 188 may be utilized to identify the appropriate affect distribution for a particular message between two communities based upon an identification of topic(s) associated with the message. In particular, according to one embodiment of the present disclosure, the mean or median of the affect scores may be chosen as the target scores for each of the three dimensions in performing text modification.

Text Modification for Target Affect

Figure 2A:
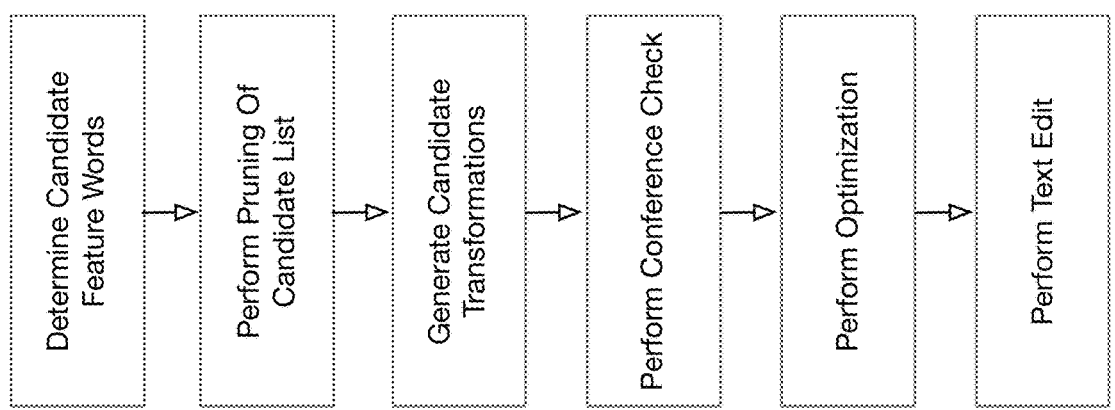
FIG. 2a is a high-level block diagram depicting a process for performing text modification for target according to one embodiment of the present disclosure.

FIG. 2a is a high-level block diagram depicting a process for performing text modification for target affect according to one embodiment of the present disclosure. For purposes of the present discussion, it is assumed that an audience affect model map 186 and a topic affect model map 188 have been generated as discussed with reference to FIGS. 1a-1e. Audience affect model map 186 and topic affect model 188 respectively allow targeting/tailoring a message to a specific recipient/audience with optimized affect and for a specific topic with optimized affect. According to one embodiment of the present disclosure, the author of a message may choose to tune the tone of the message for either the recipient or topic or some mixture of both. According to one embodiment of the present disclosure, the author of a message can manually tune the tone of a message along the affect dimensions (e.g., f, p and fr). However, any number of other affect dimensions may be utilized.

As shown in FIG. 2a, candidate feature words are determined. The candidate list of feature words is then pruned. Next, transformations are generated for the pruned candidate list of feature words. A coherence check is then performed followed by an optimization process. Finally, a text edit is performed based upon the optimized transformations.

Figure 2B:
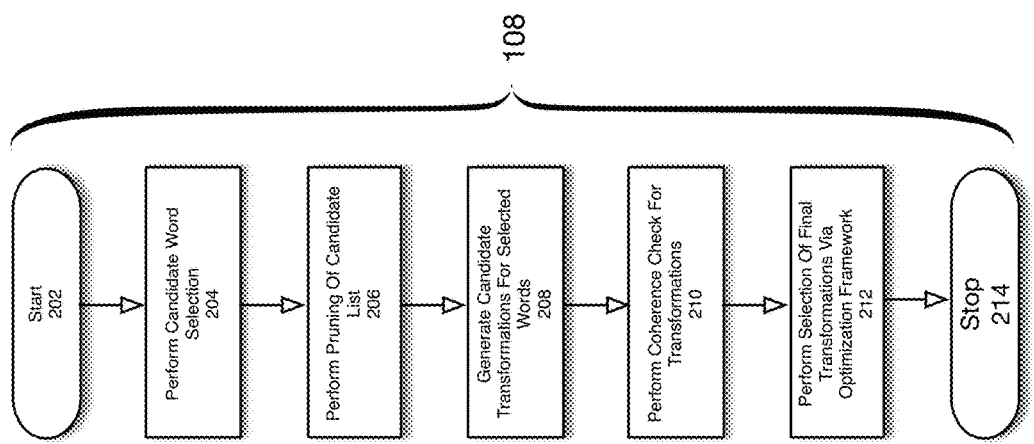
FIG. 2b is a flowchart of a process for performing text modification for target affect according to one embodiment of the present disclosure.

FIG. 2b is a flowchart of a process for performing text modification for target affect according to one embodiment of the present disclosure. The process is initiated in 202. In 204, a candidate word selection process is performed. According to one embodiment of the present disclosure, a linear regression model is trained that models various dimensions of affect (such as formality, politeness or frustration) in text messages. In particular, a regression model is trained:

$$X \rightarrow Y$$

where X represents one or more features (i.e., candidate words) and Y represents one or more affect scores (e.g., politeness, frustration or formality).

Candidate word selection chooses words that belong to the important features that help in the prediction of Frustration, Formality, and Politeness. The candidate words are not predicted. Instead, the model identifies important features for the task. The words that belong to these features are considered as the first set of candidate words. The regression model predicts the affect values (frustration, formality, politeness) based upon these features. The regression model is trained on input text utilizing tags characterizing the affect (frustration, politeness, formality) on untagged data. As previously disclosed, any other affects may be utilized.

According to one embodiment of the present disclosure, the features used for the linear regression may include the following include lexical features:
Average Word Length
Average Words per Sentence
of Upper Case Words
Ellipses
Exclamation marks,
Question Mark
Multiple Question Marks
Words, #Lower Case words
First word upper case
NonAlphaChars
Punctuation Chars)

According to one embodiment of the present disclosure, the following syntactic features may be utilized:
BlankLines
NER-Person
NER-Location
NER-PersonLength
NER-Organization
TextDensity According to one embodiment of the present disclosure, the following derived features may be utilized:
Contractions
ReadabilityScore-FKgrade
FirstPerson
Hedge
Subjectivity
Sentiment
ThirdPerson
SignOff According to one embodiment of the present disclosure, the following affect/psycholinguistic features (which may be based on various lexica) are utilized:
ANEW-arousal
ANEW-dominance
ANEW-valence
EmolexIntensity-anger
EmolexIntensity-fear
EmolexIntensity-joy
EmolexIntensity-sadness
Emolex-anger
Emolex-anticipation,
Emolex-disgust
Emolex-fear
Emolex-joy
Emolex-negative
Emolex-positive
Emolex-sadness
Emolex-surprise
Emolex-trust
Perma-NEG-A
Perma-NEG-E
Perma-NEG-M
Perma-NEG-P
Perma-NEG-R
Perma-POS-A
Perma-POS-E
Perma-POS-M
Perma-POS-P
Perma-POS-R From these, examples of the important features identified by the regression step include:
Perma-POS-R
Perma-NEG-M
Perma-NEG-A
ANEW-arousal
ANEW-dominance
Emolex Intensity Sadness All affect features are considered as candidate words. A determination of the words to be used as potential replacement words when attempting to achieve a target affect may then performed. The list of features or the types of words mentioned may include certain emotion/sentiment related words, certain type of grammar words, etc.

The candidate list of replacement words determined in 204 typically may include many irrelevant words. These words have not been bounded by any rule or norm. Accordingly, in 206, the candidate list determined in 204 is pruned. According to one embodiment of the present disclosure, an inverse document frequency ("IDF") technique is utilized to perform the pruning operation. In particular, an IDF measures how much information a word provides (i.e., whether the word/term is common across documents). According to one embodiment of the present disclosure an IDF score is generated as the logarithmically scaled inverse fraction of documents that contain a word obtained by dividing the total number of documents by the number of documents containing a particular term and then taking the logarithm of that quotient as follows:

$$IDF_w = \log \frac{N}{df_w}$$

where $df_w$ is the number of documents containing a word. An IDF cut-of may be determined empirically.

In 208, candidate transformations are generated for selected words. For purposes of the present discussion, the term "transformation" refers to all possible replacements, insertions or deletions that can be performed for a given set of words. The candidate transformations may be based upon a subset of features that are used to model the original mood or affect. According to one embodiment of the present disclosure, the feature set may be limited to affect-related and part-of-speech tagged features. This results in a bag of words of possible changes that may be performed on an input text to achieve a desired target. According to one embodiment of the present disclosure, the transformations are generated by performing a lookup using standard dictionaries such as WORDNET to generate semantically similar words to the candidate words. The bag of words is constrained by the type of features (affect—words etc.) and generated using WORDNET or a semantic dictionary, for example.

Not all possible word replacements are grammatically relevant in the context in which a text is placed. Accordingly, in 210, a coherence check is performed for the transformations determined in 208. According to one embodiment of the present disclosure, a pointwise mutual information ("PMI") based measure may be utilized to check for coherency. The PMI captures the relevance of a word or a set of words in the presence of the context to determine whether the transformation (word that replaces the candidate word will be coherent). PMI between words a and b may be expressed as follows:

$$pmi(a, b) \equiv \log\left(\frac{P(a, b)}{P(a) * P(b)}\right)$$

where P refers to a probability. In this case, the context is the set of words surrounding the new replacement word that the algorithm has proposed, which further prunes the candidate list.

In 212, a final selection of transformations is performed via an optimization framework. In particular, according to one embodiment of the present disclosure, the best possible word-replacements or transformations are determined to achieve a pre-calculated target. According to one embodiment of the present disclosure, the problem is modeled as a linear optimization. The optimization step is to minimize the distance between the affect of the input text and the affect of the target as follows:

$$(\min | \text{Affect}_{target} - \text{Affect}_{modified\_text} |)$$

This may be achieved by using transformations that have been defined so far:

(Select $T_{final} \subset$ {additional→extra,additional→further, require→ask, . . . }

Further, according to one embodiment of the present disclosure, the optimization is constrained to allow a maximum of one transformation on a given word. For example, if "additional" is being replaced with "extra", then "extra" in the corresponding sentence cannot be further changed. This heuristic may be represented as:

1additional→extra+1additional→further
<=1require→ask<=

According to one embodiment of the present disclosure, a selection and replacement or insertion of a candidate word produced within a content variation is selected that is closer to a target content variation. In particular, the best possible word transformation is selected that reduces the distance between the current content affect and the target affect. This may be expressed as follows:

Select $T_{final} \subset$ {additional→extra,additional→further, require→ask, . . . }

$\min | \text{Affect}_{target} - \text{Affect}_{modified\_text} |$ subject to: $1_{additional \to extra} + 1_{additional \to further} \leq 1$ $1_{require \to ask} \leq 1 \ldots$ The above expression may be solved using an optimization technique, which for example may greedily attempt to achieve transformations that reduce the gap between affect (content) and affect (target). The output of 212 may be the input text with new words (i.e., content variation/transformation).

The process ends in 214.

Figure 3:
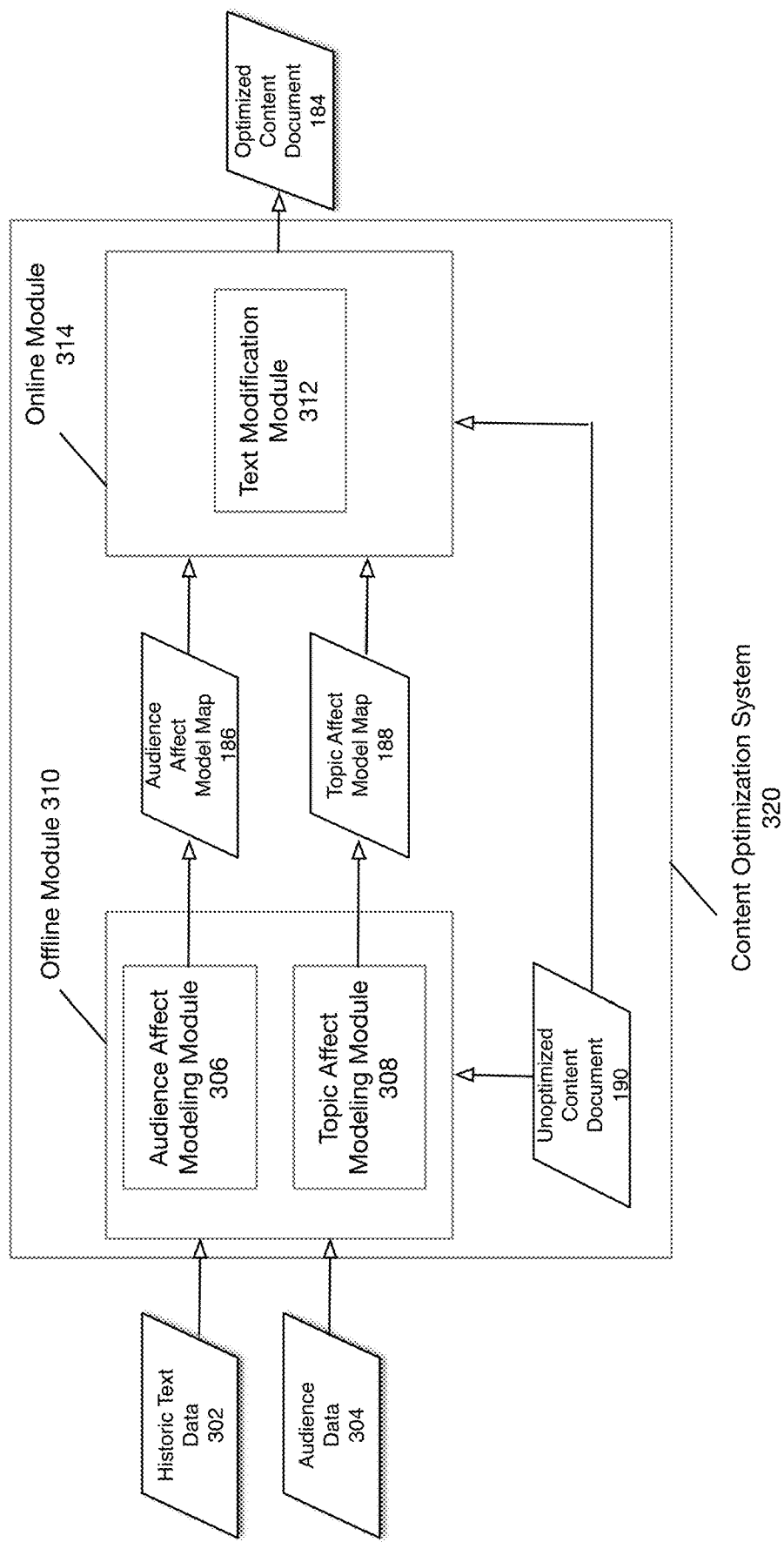
FIG. 3 is a block diagram of a content optimization system according to one embodiment of the present disclosure.

FIG. 3 is a block diagram of a content optimization system according to one embodiment of the present disclosure. As shown in FIG. 3, content optimization system 320 may further comprise offline module 310, and online module 314. Offline module 310 may further comprise audience affect modeling module 306 and topic affect modeling module 308. Online module 314 may further comprise text modification module 312. Offline module 310 may receive historic data 302 and audience data 304 to generate an audience affect model map 186 and topic affect model map 188 respectively via audience affect modeling module 306 and topic affect modeling module 308. Audience data 304 may comprise any data characterizing a particular community or set of communities such as the users in a community or communities and their interrelationships. Online module 314 may receive unoptimized content document 190, audience affect model map 186 and topic affect model map 188 to generate optimized content document 184. According to one embodiment of the present disclosure, audience affect modeling module 306 may perform a process as described with respect to FIGS. 1b-1c. Topic affect modeling module 308 may perform a process as described with respect to FIGS. 1d-1e. Text modification module 312 may perform a process as described with respect to FIGS. 2a-2b.

Example Output

The following are examples of performing a content optimization process according to FIGS. 1a-1e, 2a-2b and 3 with respect to an unoptimized content document 190.

Input Text

The Coca-Cola system is not a single entity from a legal or managerial perspective, and our Company does not own or control the majority of the companies that comprise our bottling system. Comprised of The Coca-Cola Company and nearly 250 bottling partners, we have more than 700,000 associates in our system.

Recent sustainability Reports 2016/2017 Sustainability Report 2015/2016 Sustainability Report 2014/2015 Sustainability Report 2013/2014 Sustainability Report We are a global business, yet we function on a local scale in the communities where we operate.

The Coca-Cola Company has a longstanding commitment to reporting on our sustainability journey.

Text Variation for Teenagers

The Coca-Cola system is not a single entity from a legal or managerial perspective, and our Company does not own or manage the bulk of the companies that cover our bottling system. Comprised of The Coca-Cola Company and almost 250 bottling partners, we have more than 700,000 partners in our system.

Recent Sustainability Reports 2016/2017 Sustainability Report 2015/2016 Sustainability Report 2014/2015 Sustainability Report 2013/2014 Sustainability Report 2012/2013 Sustainability Report We are a global business yet we work on a local scale in the communities where we operate. The Coca-Cola Company has a longstanding commitment to reporting on our sustainability journey.

Text Variation for Sustainability

The Coca-Cola system is not a single entity from a legal or managerial perspective, and our Company does not own or operate the majority of the companies that cover our bottling system.
Comprised of The Coca-Cola Company and nearly 250 bottling partners, we have more than 700,000 partners in our system.
Recent Sustainability Reports 2016/2017 Sustainability Report 2015/2016 Sustainability Report 2014/2015 Sustainability Report 2013/2014 Sustainability Report 2012/2013 Sustainability Report We are a global business yet we work on a smaller scale in the communities where we operate. The Coca-Cola Company has a longstanding commitment to reporting on our sustainability journey.

Text Variation for New Product Announcements

The Coca-Cola system is not a single entity from a judicial or managerial perspective, and our Company does not own or control the majority of the companies that comprise our bottling system.
Comprised of The Coca-Cola Company and nearly 250 bottling partners, we have more than 700,000 associates in our system.
Recent Sustainability Reports 2016/2017 Sustainability Report 2015/2016 Sustainability Report 2014/2015 Sustainability Report 2013/2014 Sustainability Report 2012/2013 Sustainability Report We are a global business yet we work on a local scale in the communities where we operate. The Coca-Cola Company has a longstanding promise to informing on our sustainability journey.

Integration in Computing System and Network Environment

Figure 4A:
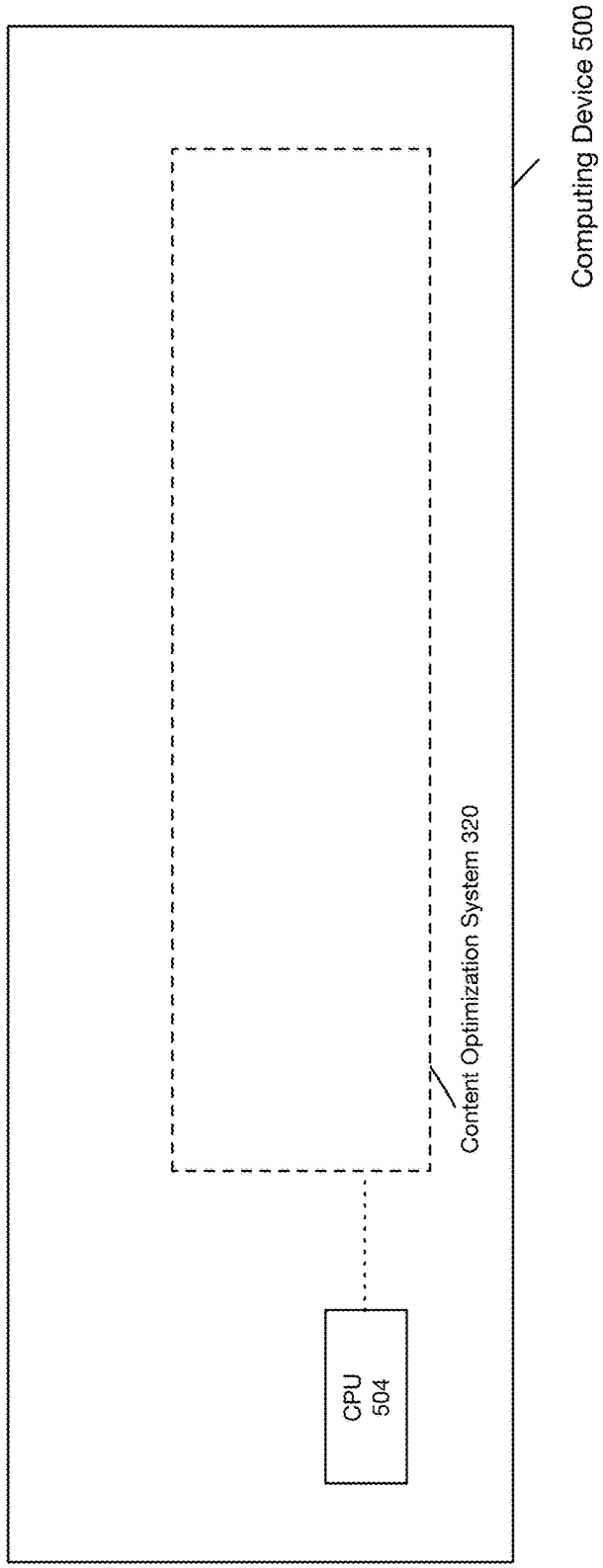
FIG. 4a illustrates an example computing system that executes a content optimization system according to one embodiment of the present disclosure.

FIG. 4a illustrates an example computing system that executes a content optimization system 320 according to one embodiment of the present disclosure. As depicted in FIG. 4a, computing device 500 may include CPU 504 that executes one or more processes to perform content optimization system 320. In particular, CPU 504 may be further configured via programmatic instructions to execute content optimization system 320 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform.

Figure 4B:
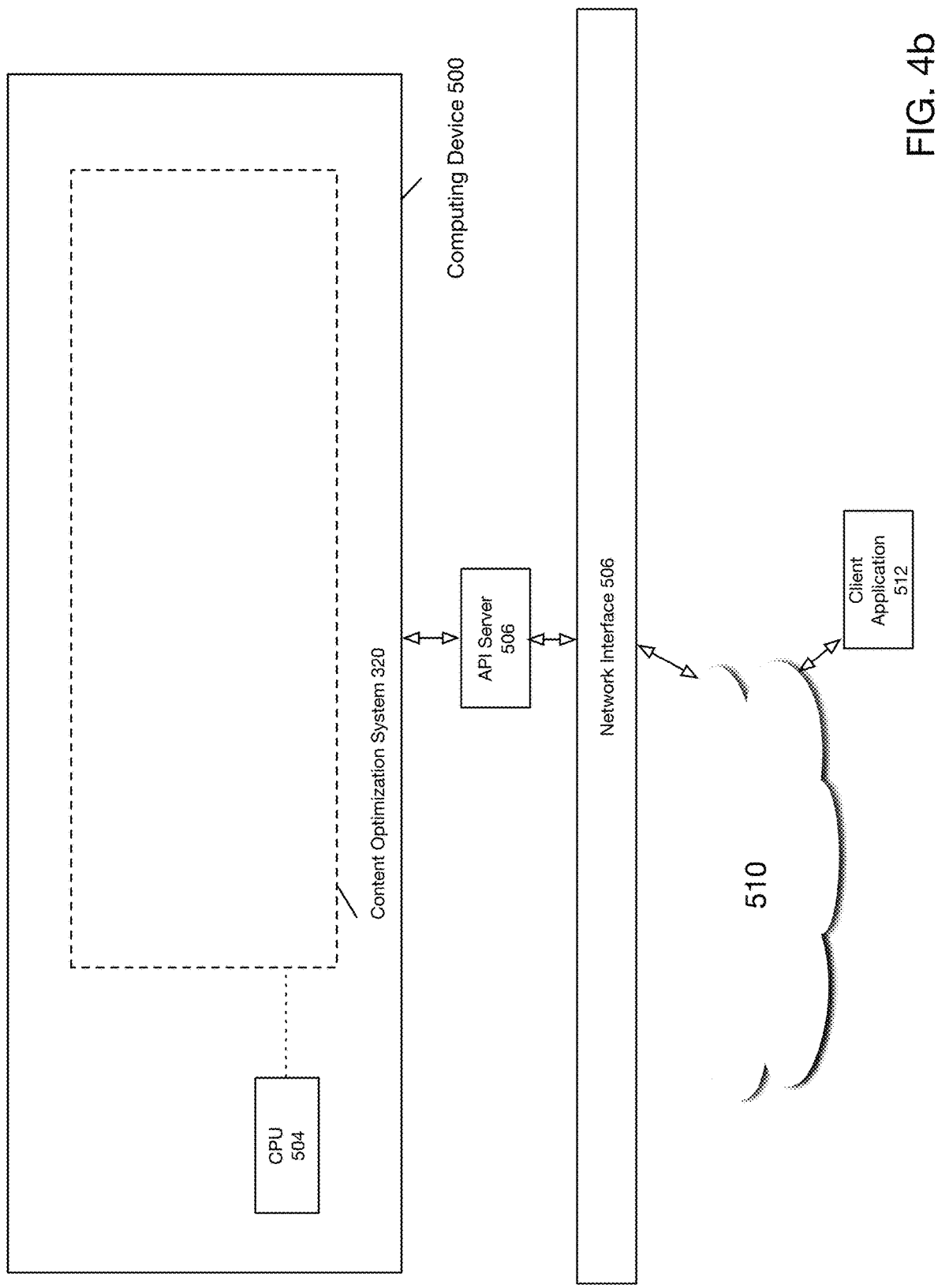
FIG. 4b illustrates an example integration of a content optimization system into a network environment according to one embodiment of the present disclosure.

FIG. 4b illustrates an example integration of a content optimization system 320 into a network environment according to one embodiment of the present disclosure. As depicted in FIG. 4b, computing device 500 may be collocated in a cloud environment, data center, local area network ("LAN") etc. Computing device 500 shown in FIG. 4b is structured identically to the example embodiment described with respect to FIG. 4a. As shown in FIG. 4b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 4a or 65, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for performing unsupervised content optimization, the method comprising:
processing historic data to generate an audience affect model map that represents a first target emotional affect for communications between first and second communities, each of which includes a plurality of community members;
processing historic data to generate a topic affect model map that represents a second target emotional affect for communications related to a particular topic; and,
performing unsupervised content optimization on an input content document that (a) relates to said particular topic, and (b) is from a member of said first community to a member of said second community, wherein performing unsupervised content optimization comprises using said audience affect model map and said topic affect model map by
performing a candidate word selection using said audience affect model map and said topic affect model map to generate a preliminary list of candidate words;
pruning said preliminary list of candidate words to generate a final list of candidate words;
generating candidate word transformations for candidate words included in said final list of candidate words; and,
performing a transformation on said input content document using said generated candidate word transformations to generate an optimized content document.

2. The method according to claim 1, wherein generating candidate word transformations comprises:
performing a coherence check for a set of preliminary transformations; and,
performing a selection of final transformations via an optimization framework.

3. The method according to claim 1, wherein processing historic data to generate an audience affect model map comprises:
generating a graph comprising a series of nodes and edges wherein each node represents a user and each edge represents an exchange of messages between two users;
analyzing said graph to determine a plurality of communities that includes said first and second communities; and,
determining an affect probability distribution between said first and second communities.

4. The method according to claim 3, wherein said affect probability distribution is determined by computing at least one affect score for a message exchanged between said member of said first community and said member of said second community.

5. The method according to claim 4, wherein at least one of said affect scores is one of formality (f), politeness (p), and frustration (fr).

6. The method according to claim 1, wherein processing historic data to generate a topic affect model map comprises:
identifying a plurality of topics that includes said particular topic;
generating a topic vector for each of a plurality of messages, wherein each component of said topic vector is associated with one of said topics, and wherein each component of said topic vector comprises an affect score for said associated topic;
performing a clustering operation on said topic vectors; and,
associating said particular topic with said second target emotional affect based upon said affect scores for said particular topic.

7. The method according to claim 6, wherein said plurality of topics are identified using latent Dirichlet allocation ("LDA") topic modeling.

8. A system for performing content optimization, the system comprising:
an offline module including
an audience affect modeling module that processes historic data to generate an audience affect model map that represents a first target emotional affect for communications between first and second communities, each of which includes a plurality of community members; and
a topic affect modeling module that processes historic data to generate a topic affect model map that represents a second target emotional affect for communications related to a particular topic; and,
an online module including a text modification module that performs a content optimization of an input content document that (a) relates to said particular topic, and (b) is from a member of said first community to a member of said second community, wherein said content optimization is based upon said audience affect model map and said topic affect model map to generate an optimized content document.

9. The system according to claim 8, wherein said audience affect model map represents a plurality of first target emotional affects for communications between said first and second communities.

10. The system according to claim 8, wherein said topic model map represents a plurality of second target emotional affects for communications related to said particular topic.

11. The system according to claim 8, wherein said text modification module is adapted to:
perform a candidate word selection using said audience affect model map and said topic affect model map to generate a preliminary list of candidate words;
prune said preliminary list of candidate words to generate a final list of candidate words;
generate candidate word transformations for candidate words included in said final list of candidate words; and,
perform a transformation of said input content document using said generated candidate word transformations.

12. The system according to claim 8, wherein said audience affect modeling module is adapted to:
generate a graph comprising a series of nodes and edges wherein each node represents a user and each edge represents an exchange of messages between two users;
analyze said graph to determine a plurality of communities that includes said first and second communities; and,
determine an affect probability distribution between said first and second communities.

13. The system according to claim 8, wherein said topic affect modeling module is adapted to:
identify a plurality of topics that includes said particular topic;
generate a topic vector for each of a plurality of messages, wherein each component of said topic vector is associated with one of said topics, and wherein each component of said topic vector comprises an affect score for said associated topic;

perform a clustering operation on said topic vectors; and, associate said particular topic with said second target emotional affect based upon said affect scores for said particular topic.

14. The system according to claim 13, wherein at least one of said affect scores is one of formality (f), politeness (p) and frustration (fr).

15. A computer program product including one or more non-transitory machine-readable mediums encoded with instructions that when executed by one or more processors cause a process to be carried out for performing a content optimization, the process comprising:

processing historic data to generate an audience affect model map that represents a first target affect for communications between first and second communities, each of which includes a plurality of community members;

processing historic data to generate a topic affect model map that represents a second target affect for communications related to a particular topic; and, performing a content optimization on an unoptimized content document that (a) relates to said particular topic, and (b) is from a member of said first community to a member of said second community, wherein performing said content optimization comprises using said audience affect model map and said topic affect model map by performing a candidate word selection using said audience affect model map and said topic affect model map to generate a preliminary list of candidate words;

pruning said preliminary list of candidate words to generate a final list of candidate words;

generating candidate word transformations for candidate words included in said final list of candidate words; and performing a transformation of said unoptimized content document using said generated candidate word transformations to generate an optimized content document.

16. The computer program product according to claim 15, wherein generating candidate word transformations comprises:

performing a coherence check for a set of preliminary transformations; and, performing a selection of final transformations via an optimization framework.

17. The computer program product according to claim 15, wherein processing historic data to generate an audience affect model map comprises:

generating a graph comprising a series of nodes and edges wherein each node represents a user and each edge represents an exchange of messages between two users;

analyzing said graph to determine a plurality of communities that includes said first and second communities; and, determining an affect probability distribution between said first and second communities.

18. The computer program product according to claim 17, wherein said affect probability distribution is determined by computing at least one affect score for a message exchanged between said member of said first community and said member of said second community.

19. The computer program product according to claim 18, wherein at least one of said affect scores is one of formality (f), politeness (p) and frustration (fr).

20. The computer program product according to claim 15, wherein processing historic data to generate a topic affect model map comprises:

identifying a plurality of topics that includes said particular topic;

generating a topic vector for each of a plurality of messages, wherein each component of said topic vector is associated with one of said topics, and wherein each component of said topic vector comprises an affect score for said associated topic;

performing a clustering operation on said topic vectors; and, associating said particular topic with said second target affect based upon said affect scores for said particular topic.

* * * * *